Dec. 27, 1966 T. J. VAN KESSEL 3,295,072

MEANS FOR REDUCING SIGNAL COMPONENTS OUTSIDE OF THE DESIRED BAND IN A COMPATIBLE SINGLE SIDEBAND SYSTEM

Filed Dec. 23, 1963

INVENTOR.
T. J. VAN KESSEL

BY

Frank R. Jefan
AGENT

United States Patent Office 3,295,072

Patented Dec. 27, 1966

3,295,072

MEANS FOR REDUCING SIGNAL COMPONENTS OUTSIDE OF THE DESIRED BAND IN A COMPATIBLE SINGLE SIDEBAND SYSTEM

Theodorus Jozef van Kessel, Emmasingel, Eindhoven, Netherlands, assignor to North American Philips Company, Inc., New York, N.Y., a corporation of Delaware Filed Dec. 23, 1963, Ser. No. 332,720
Claims priority, application Netherlands, Jan. 11, 1963, 287,705
9 Claims. (Cl. 332—41)

This invention relates to a system for transmitting amplitude-modulated oscillations, of the type in which the information content is mainly concentrated in one sideband. The transmitting system comprises a first amplitude modulator fed by the signals to be transmitted and an associated oscillator carrier-wave oscillator and an output filter, the carrier oscillation and one of the sidebands for the further transmission being derived from said amplitude modulator. In a second amplitude modulator the signal derived from the first amplitude modulator is modulated with itself. The transmitting system is furthermore provided with an output filter which allows only the frequency band at twice the carrier frequency to pass. The signals emanating from the second amplitude modulator are applied to an amplitude limiter. The output signals of the limiter, which have a constant amplitude, are fed as a carrier-wave oscillation to an output modulator stage, to which the signals to be transmitted are fed as a modulation voltage. This arrangement is disclosed in copending patent application Serial No. 186,255, filed April 9, 1962.

As is described in detail in the above application, such a transmitting device can be advantageously used for broadcast purposes, since the signals emitted by the transmitting system can be detected in a conventional amplitude demodulator with excellent reproduction quality, and also since, with the same transmission power, the emitter power of the information signals as compared with the carrier-wave power is considerably raised. An appreciable economy in bandwidth is also obtained, because the information content of the transmitted signals is concentrated mainly in one sideband. In this system the signal components lying beyond the sideband concerned are greatly attenuated.

The invention has for its object to attenuate further, in a particularly simple manner these frequency components lying beyond the sideband concerned, so that apart from a considerable reduction of the relative reaction of neighbouring transmitters, the reproduction quality is improved.

According to the invention, in at least one of the circuits including (1), the circuit leading to the limiting stage and (2), the circuit leading to the output modulator and conveying the modulation voltage, a dynamic control-device is provided for increasing the ratio between the modulation index of the signal fed to the limiting stage and the modulation voltage fed to the output modulator with an increasing amplitude of the information signals to be transmitted.

In order to ensure an optimum suppression of the frequency components lying beyond the sideband concerned the dynamic control-device has a dynamic control-characteristic which, with an amplitude $a$ of the information signals to be transmitted, increases the ratio between the modulation index of the signal fed to the limiting stage and the modulation voltage fed to the output modulator by a factor $$\frac{1-\sqrt{(1-4a^2)}}{2a^2}$$

or approximately by the factor $(1+a^2)$. The term "modulation index" as used herein means the ratio between the amplitude of the envelope of the signal applied to the limiting stage and the amplitude of the carrier oscillation.

A particularly advantageous embodiment is characterized in that the dynamic control-device is included in the circuit of the first amplitude modulator.

The invention and its advantages will now be described more fully with reference to the drawing, wherein:

FIG. 1 shows in a block diagram a system according to the invention.

FIGS. 2*a*, 2*b*, 2*c* and 2*d* and 3*a*, 3*b* and 3*c* show a few diagrams for explaining the system according to the invention.

Figures 1, 2A, 2B, 2C, 2D, 3A, 3B, 3C, 4, 5, 6:
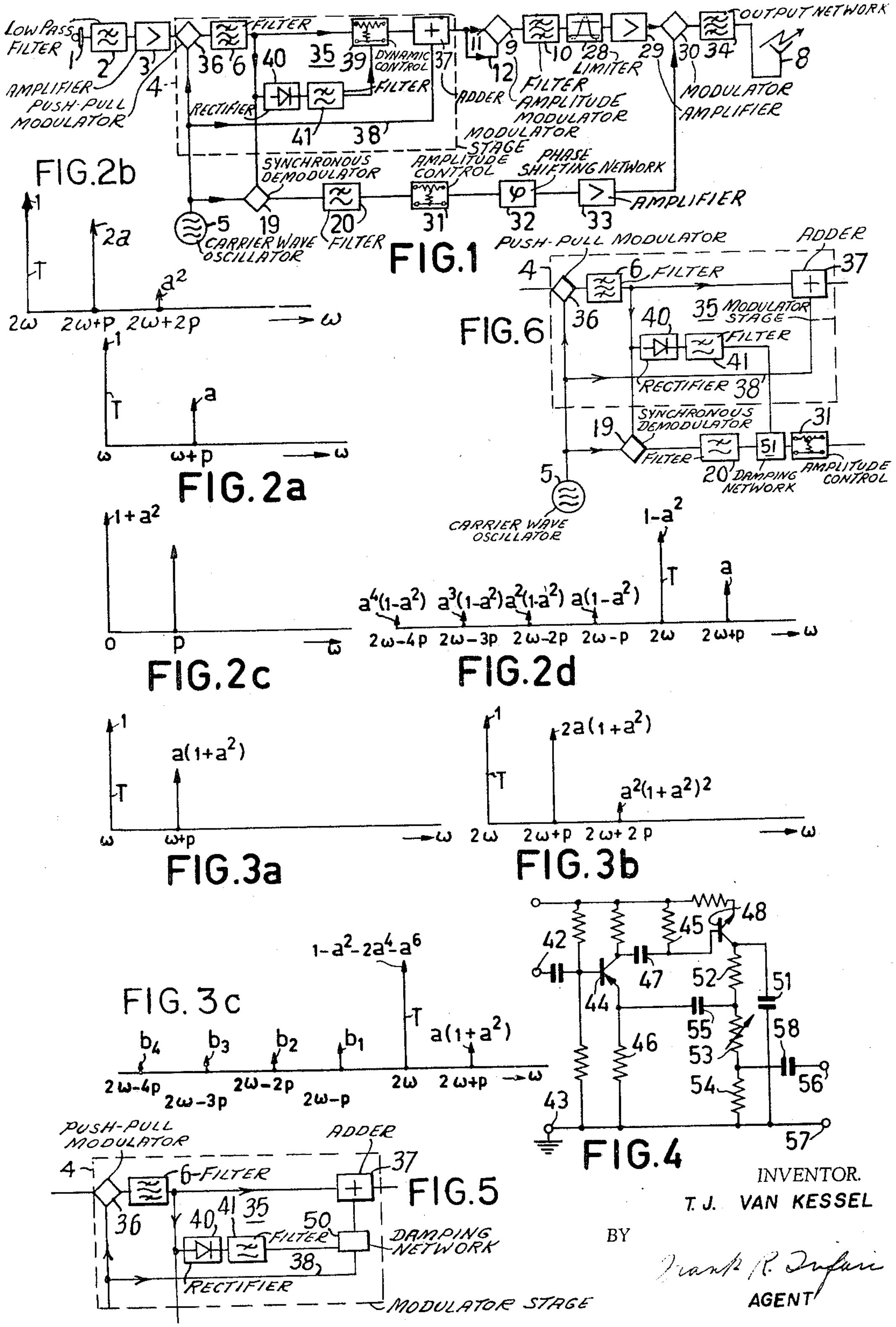
FIG. 4 shows a detail diagram of the dynamic control-device used in the system shown in FIG. 1.
FIGS. 5 and 6 illustrate modifications of a portion of the system of FIG. 1.

In the transmitting system according to the invention, as shown in FIG. 1, for the transmission of music or speech signals in the band from 30 to 9000 c/s, the signals from a microphone 1 are fed via a low bandpass filter 2 and a low-frequency amplifier 3 to a modulator stage 4. A carrier-wave oscillator 5 of, for example, 400 kc/s is provided to apply carrier oscillations to the modulator stage. The carrier oscillation and also the upper sideband from 400,030 to 409 k.c./s are derived from the output of the modulator stage 4, by means of a filter.

The single-sideband transmission shown here with the simultaneously carrier oscillation has, as compared with the normal amplitude modulation, the advantages that with the same transmission power the power of the information signals can be raised considerably and that an economy in frequency can be obtained. On the contrary, considerable signal distortions occur in the reception of the oscillations transmitted by the transmitting device in a conventional amplitude-modulation receiver, for example with a modulation index of 0.7, a distortion of about −15 db occurs. In the above application these signal distortions in the reception by a conventional amplitude-modulation receiver are greatly reduced by the measures described therein, so that the aforesaid advantages are combined with the excellent reproduction quality of the reception in a conventional amplitude-modulation receiver.

According to the above application, the amplitude modulator 4 is followed by a second amplitude modulator 9, in which the signal derived from the first-mentioned amplitude-modulator 4 is amplitude-modulated as a carrier oscillation by the same signal as a modulation signal. The transmitting system comprises an output filter 10, which allows only the signals of the signal band at twice the carrier frequency to pass. In the embodiment described the signal derived from the amplitude modulator 4 is fed to the amplitude modulator 9 on the one hand via the conductor 11 as a carrier oscillation and on the other hand via the conductor 12 as a modulation signal.

If, for example, the output signal of the amplitude modulator 4 consists of the carrier wave T of an amplitude 1 and an angular frequency $\omega$ and a signal sideband of the amplitude $a$ and an angular frequency $(\omega+p)$, this signal is given by the formula: $\cos \omega t + a \cos(\omega+p)t$ and is modulated with itself in the amplitude modulator 9, so that at twice the carrier frequency a signal of $\frac{1}{2} \cos \omega t + a \cos (2\omega+p)t + \frac{1}{2}a^2 \cos (2\omega+2p)t$ is formed. This signal is allowed to pass by the output filter 10. By way of illustration FIG. 2*a* shows the frequency spectrum of the output signal of the amplitude modulator 4 and FIG. 2*b* shows the frequency diagram of the output signal of the amplitude modulator 9, the amplitude of the carrier oscillation, the angular frequency of which is $2\omega$, being again reduced to the value 1.

In the above application it is described that by this particularly simple measure, the reproduction quality of the reception of signals transmitted by the amplitude modulator 9 in a conventional amplitude-modulation receiver is materially improved. In the manner described in the above application the envelope of the signal illustrated in FIG. 2*b* can be mathematically represented by the formula:

$$\sqrt{(1+2a\cos pt+a^2\cos 2pt)^2+(2a\sin pt+a^2\sin 2pt)^2}$$

which gives, after reduction:

$$1+a^2+2a\cos pt$$

which means that with the reception in a conventional amplitude-modulation receiver the transmitted signal is restored without distortion. For the sake of completeness FIG. 2*c* illustrates the frequency spectrum of the envelope signal.

Thus a material improvement in the reproduction quality was achieved in the reception of the transmitted signals in a conventional amplitude-modulation receiver, although signal distortions, still occur, though materially reduced. Such distortions are due to intermodulation products, if several frequency components are simultaneously contained in the transmitted signals. In the most unfavorable case the distortion level may be —25 db. As a matter of course, the average distortion level is considerably smaller than this theoretical maximum, which will occur only under very particular conditions.

In accordance with further measures described in the above application these residual distortion products are further reduced by limiting the output signal of the amplitude modulator 9 in an amplitude limiter 28 to a constant value. The limited signal of constant amplitude is fed, subsequent to amplification in an amplifier 29, as a carrier oscillation to an output modulator 30, the modulation signal of which is formed by the low-frequency signal to be transmitted, which is derived from a synchronous demodulator 19, connected to the modulator stage 4. For synchronous demodulation the demodulator 19 has connected to it the carrier-wave oscillator 5. The low-frequency signal obtained by synchronous demodulation is fed, as a modulation signal to the output modulator 30, via a low bandpass filter 20, an adjustable amplitude control 31 and an adjustable phase-shifting network 32, subsequent to amplification in an amplifier 33. The amplitude-modulated signal obtained from the output modulator 30 is transmitted via an output network 34 by the transmitting antenna 8.

FIG. 2*d* illustrates the frequency spectrum obtained by limiting the signal shown in FIG. 2*b*. This spectrum can be calculated in a comparatively simple manner in a mathematical formula. Upon the modulation of this signal by the associated envelope signal the frequency spectrum shown in FIG. 2*b* must again be obtained from the amplitude modulator 9.

When the signal limited in the amplitude limiter 28 is modulated by the initial low-frequency signal in the output modulator 30, i.e. when the envelope signal of the signal transmitted by the modulator 9 is replaced by the initial signal, the demodulation of the signals from the antenna 8 in a conventional amplitude-modulation receiver, which reproduces also the envelope signal, restores substantially the initial low-frequency signal. The single-sideband character of the transmitted signals is substantially maintained, since the envelope of the output signal of the amplitude modulator 9 in itself constitutes a very satisfactory approximation of the initial low-frequency signal. Beyond the desired frequency band, particularly on the side of the suppressed signal sideband, i.e. in this embodiment on the left-hand side of the carrier oscillation T, undesirable frequency components nevertheless occur, though in a considerably attenuated state. The total level of these undesirable frequency components may amount to —25 db.

The present invention has for its object to further reduce these frequency components lying beyond the signal band. In accordance with the invention the circuit of the modulator stage 4 includes a dynamic control-device 35, which, with an increasing signal amplitude *a*, produces an increase in the modulation index of the single-sideband signal obtained from the modulator stage 4. The carrier oscillation is also present in the output of the modulating stage 4.

In order to ensure this increase in modulation index with an increasing signal amplitude *a* in a simple manner, the modulator stage 4 comprises, in order to produce the single-sideband signal with the transmitted carrier wave, a push-pull modulator 36, operating with carrier-wave suppression and a subsequent single-sideband filter 6, for producing separately the signal sideband, and an adding stage 37 for adding the carrier oscillattion via the conductor 38 to the signal sideband via the dynamic control-device. The dynamic control-device 35 comprises a dynamic control 39 constructed in the form of a variable damping network, a dynamic voltage rectifier 40, and the associated smoothing filter 41 for producing the dynamic control-voltage to govern the dynamic control 39 in accordance with the signal amplitude *a*. Optimum suppression of the frequency components lying beyond the signal band is obtained, when the dynamic control-characteristic varies in accordance with the signal amplitude *a* as the function $(1+a^2)$.

When this device receives an input signal of the frequency *p* and the amplitude *a*, modulation in the push-pull modulator 36, and the subsequent wave suppression in filter 6 produces a signal sideband of the waveform $a\cos(\omega+p)t$, which is fed to the dynamic control 39. Here the amplitude is increased in accordance with the dynamic control-characteristic $(1+a^2)$, which means that across the output circuit of the dynamic control-device 35 a signal sideband $a(1+a^2)\cos pt$ is produced. In the adding stage 37 in the transmitting device the signal sideband thus obtained is combined, for further processing, with the carrier wave $\cos\omega t$ of the amplitude 1. The frequency diagram of the signal obtained from the adding stage 37 is illustrated in FIG. 3*a*.

By a comparison with the corresponding signal of FIG. 2*a* of the transmitter described in the above application, the transmitting system according to the present invention is found to differ since the amplitude value *a* of FIG. 2*a* is replaced by the amplitude value $a(1+a^2)$ in FIG. 3*a*. On the basis of FIGS. 2*b* and 2*c* the corresponding frequency diagrams according to the invention can be directly derived by replacing the magnitude *a* of FIGS. 2*b* and 2*c* by the magnitude $a(1+a^2)$. FIG. 3*b* shows the output signal of the amplitude modulator 9 and FIG. 3*c* shows the output signal of the limiter 28. The amplitude values $b_1, b_2, b_3, b_4, \ldots$ of FIG. 3*c* are related to the amplitude *a* of the output signal in accordance with the functions:

$$b_1=-a+3a^5+3a^7+a^9$$
$$b_2=a^2+a^4-3a^6-6a^8-4a^{10}-a^{12}$$
$$b_3=-a^3-2a^5+2a^7+9a^9+10a^{11}+5a^{13}+a^{15}$$
$$b_4=a^4+3a^6-11a^{10}-19a^{12}-15a^{14}-6a^{16}-a^{18}.$$

As described in the above application the limited single-sideband signal is amplitude-modulated as a carrier oscillation in the output modulator 30 by the initial low-frequency signal. The amplitude modulation of the limited single-sideband signal with the frequency characteristic shown in FIG. 3*c* produce the result that the signals emitted by the transmitting antenna 8 do not contain the undesirable frequency components lying beyond the signal band. Due to the increase in modulation index by the dynamic control-device 35 the correct functional relationship of the spectrum components of the limited single-sideband signal with respect to the amplitude *a* of the initial signal to be transmitted is obtained, so that as a result of the modulation process in the output modulator 30 all undesirable spectrum components lying beyond the signal band are suppressed. This may be proven by calculation and by experiments.

The increase in modulation index by dynamic increase of the signal sideband by a factor $(1+a^2)$ may be obtained also by including the dynamic control in the carrier-wave conductor 38, as shown in FIG. 5, in order to control the carrier-wave amplitude inversely proportional to the factor $(1+a^2)$, since the ratio between the signal sideband and the carrier-wave amplitude and hence the modulation index remain the same. In this case the output of the filter 41 is applied to a damping network 50 in conductor 38. Not only by including the dynamic control-device in the manner described above in the circuit of the amplitude modulator 4, but also by increase in modulation index of the output signal of the amplitude modulator 9, for example by amplitude control of the carrier-wave amplitude or by including the dynamic control-device in the modulation-voltage conductor leading to the output modulator 30 as shown in FIG. 6, the purpose aimed at can be obtained. Thus, in this case the output of filter 41 is applied to damping network 51 between filter 20 and amplitude control 31.

All these embodiments are invariably characterized in that at least in one of the circuits including (1), the circuit leading to the limiter 28 and (2), the modulation-voltage conductor leading to the output modulator 30, there is provided a dynamic control-device which increases, with an increase in signal amplitude of the signal to be transmitted, the ratio between the modulation index of the signal fed to the limiter 28 and the modulation voltage of the output modulator 30. With all these embodiments it is technically to be preferred to include the dynamic control-device in the circuit of the modulator stage 4, since the apparatus has a materially simpler structure as compared with an increase in modulation index of the output signal of the amplitude modulator 9. Further, as compared with the incorporation of the dynamic control-device in the modulation-voltage conductor leading to the output modulator 30, the transmission quality is materially improved, when received by a conventional amplitude-modulation receiver, since the envelope of the signals transmitted by the antenna 8 are not affected, which envelope is restored by amplitude modulation. When the dynamic control-device is included in the circuit of the modulator stage 4 it is found that the reproduction quality is improved, since all frequency components characteristic, in common, of the reproduced signal are now located within the signal band, so that a suppression of undesirable frequency components lying beyond the signal band is attended with an improvement in reproduction quality.

FIG. 4 shows in detail a dynamic control-device extensively tested in practice. This device is shown in a block diagram in FIG. 1.

In this device the signal sideband obtained from the push-pull modulator 36 is fed via the input terminals 42, 43 to a transistor 44, connected as an amplifier. The output signal of the amplifier 44 is derived both from a resistor included in the collector circuit and from a resistor 46 included in the emitter circuit.

The signal obtained from the collector circuit of the transistor 44 is fed via a capacitor 47 to the base electrode of a transistor 48, connected as a rectifier. The value of the signal fed to the transistor 48 can be adjusted by the adjustment of the collector resistor 45 of the transistor 44. The collector circuit of the transistor 48, consisting of a series combination of a resistor 52, a current-dependent resistor 53 and a resistor 54, shunted by a capacitor 51, will thus be traversed by a direct current, the value of which is determined by the amplitude of the signal fed to the transistor 48. The capacitor 51 with the resistors 52, 53 and 54 constitutes the smoothing filter of the transistor 48 connected as a rectifier. This network has a time constant of, for example, 10 msec.

For dynamic control the signal across the resistor 46 of the transistor 44 is fed to the junction of the resistor 52 and the current-dependent resistor 53 via a blocking capacitor 55, whereas the output signal of the dynamic-control-device is obtained from output terminals 56, 57, of which the output terminal 56 is connected via a blocking capacitor 58 to the junction of the resistor 57 and the current-dependent resistor 53, and the output terminal 57 is connected to ground. The current-dependent resistor 53 with the resistor 54 constitutes an adjustable potentiometer, the voltage ratio of which is varied in accordance with the amplitude of the incoming signal.

If, for example the amplitude of the signal sideband fed to the terminals 42, 43 increases, the value of the current-dependent resistor 53 will decrease due to the increase in the direct current traversing the collector circuit of the transistor 48, so that the division ratio of the potentiometer 53, 54 is increased with an increasing amplitude of the signal sideband resulting in the desired amplitude increase of the output signal of the dynamic control-device. The particularly simple network 52, 53, 54 provides a satisfactory approximation of the desired amplitude increase by a factor $(1+a^2)$. A suppression of the frequency components lying beyond the signal band of 40 db was measured.

It should finally be noted that the dynamic control-device may be constructed in a different manner; for example use may be made to this end of valves of variable mutual conductances or of variable damping resistors formed by rectifiers.

What is claimed is:

1. A transmitter for transmitting single-sideband signals comprising a source of information signals, a source of first carrier wave oscillations of predetermined frequency, first amplitude modulator means for amplitude modulating said first oscillations with said information signal to produce first single-sideband signals, second amplitude modulator means, first circuit means for applying the output of said first modulator means to said second modulator means by way of first and second paths, whereby the signals applied to said second modulator means by way of said first and second paths are multiplied in said second modulator means, means for limiting the output of said second modulator means to produce second carrier wave oscillations, output modulator means, means applying said second carrier wave oscillations to said output modulator means, second circuit means for applying said information signals to said output modulator means, whereby said second oscillations are modulated by said information signals, and dynamic control means connected in at least one of said first and second circuits, said dynamic control means comprising means for increasing the ratio between the modulation index of signals fed to said limiting means and the modulation voltage of said output modulator means with increase in the amplitude of said information signals.

2. The transmitter of claim 1, wherein said dynamic control means has a dynamic control characteristic which varies said ratio by at least $(1+a^2)$, wherein $a$ is the amplitude of said information signal.

3. A transmitter for transmitting single-sideband signals comprising a source of information signals, a source of first carrier wave oscillations of predetermined frequency, first amplitude modulator means for amplitude modulating said first oscillations with said information signal to produce first single-sideband signals, limiter means, first circuit means for applying the output of said first modulator means to said limiter means to produce second carrier wave oscillations, output modulator means, said first circuit means comprising second amplitude modulator means, first and second paths for applying the output of said first amplitude modulator means to said second modulator means whereby signals applied by way of said first and second paths are multiplied in said second modulator means, and means applying the signals at twice said predetermined frequency to said limiter means, means applying said second carrier wave oscillations to said output modulator means, second circuit means for applying said information signals to said output modulator means, whereby said second oscillations are modulated by said information signals, and dynamic control means connected in said first circuit, said dynamic control means comprising means for increasing the ratio between the modulation index of signals fed to said limiter means and the modulation voltage of said output modulator means with increase in the amplitude of said information signals.

4. The transmitter of claim 3, in which said first amplitude modulator comprises means for removing said first oscillations from the output thereof, and said first circuit comprises adding means, first channel means for applying the output of said first modulator means to said adding means, and second channel means for applying said first oscillations to said adding means, said dynamic control means being in one of said first and second channel means.

5. A transmitter for transmitting single-sideband signals comprising a source of information signals, a source of first carrier wave oscillations of predetermined frequency, first amplitude modulator means for amplitude modulating said first oscillations with said information signal to produce first single-sideband signals, second amplitude modulator means, first circuit means for applying the output of said first modulator means to said second modulator means by way of first and second paths, whereby the signals applied to said second modulator means by way of said first and second paths are multiplied in said second modulator means, limiter means, means for applying the output of said second modulator means at twice said predetermined frequency to said limiter means to produce second carrier wave oscillations, output modulator means, means applying said second carrier wave oscillations to said output modulator means, second circuit means for applying said information signals to said output modulator means, whereby said second oscillations are modulated by said information signals, said first circuit comprising dynamic control means for increasing the ratio between the modulation index of signals fed to said limiter means and the modulation voltage of said output modulator means with increase in the amplitude of said information signals.

6. The transmitter of claim 5, in which said first modulator means comprises means for removing said first oscillations from the output thereof, and said first circuit comprises adding means, first channel means for applying the output of said first modulator means to said adding means, and second channel means for applying said first oscillations to said adding means, said dynamic control means being in said first channel means.

7. The transmitter of claim 5, in which said dynamic control means comprises a transistor, means for applying the output of said first modulator means to the base of said transistor, a potentiometer circuit connected to the emitter of said transistor, said potentiometer circuit including a current-dependent resistor, a rectifier circuit connected to the collector of said transistor, means applying the output of said rectifier circuit to said potentiometer circuit, and means for deriving a controlled signal from said potentiometer circuit.

8. A transmitter for transmitting single-sideband signals comprising a source of information signals, a source of carrier oscillations of predetermined frequency, first amplitude modulator means for modulating said information signals on said first carrier oscillations to produce first single-sideband signals with suppressed carrier, adder means, first channel means applying said first signals to said adder means, second channel means applying said first carrier oscillations to said adder means, multiplying means, means applying the output of said adder means to said multiplying means whereby the output of said multiplying means comprises a second single-sideband signal including a carrier oscillation of twice said predetermined frequency and sideband oscillations that differ from twice said predetermined frequency by the frequency of each tone of said information signals and by twice the frequency of each said tone, limiter means for limiting said second signals to produce second carrier wave oscillations, output modulator means, means applying said second oscillations to said output modulator means, third channel means for applying said information signals to said output modulator means, whereby said second oscillations are modulated by said information signals, and dynamic control means connected in at least one of said first, second and third channel means for increasing the ratio between the modulation index of signals fed to said limiting means and the modulation voltage of said output modulator means with increase in amplitude of said information signals.

9. The transmitter of claim 8, wherein said dynamic control means has a dynamic control characteristic which varies said ratio by at least $(1+a^2)$, wherein $a$ is the amplitude of said information signal.

References Cited by the Examiner

UNITED STATES PATENTS

| | | | |
|---|---|---|---|
| 2,874,222 | 2/1959 | Jager | 325—50 |
| 3,024,313 | 3/1962 | Ensink et al. | 332—45 X |
| 3,147,437 | 9/1964 | Craft et al. | 332—41 X |

FOREIGN PATENTS

| | | |
|---|---|---|
| 112,077 | 9/1962 | Pakistan. |

NATHAN KAUFMAN, *Primary Examiner.*

ROY LAKE, *Examiner.*

A. L. BRODY, *Assistant Examiner.*